(12) United States Patent
Olofsson et al.

(10) Patent No.: US 9,357,464 B2
(45) Date of Patent: May 31, 2016

(54) ARRANGEMENT AND METHOD FOR OPTIMISING HANDLING OF HANDOVERS IN TELECOMMUNICATION SYSTEMS

(75) Inventors: Henrik Olofsson, Kista (SE); Peter Legg, Stockholm (SE); Johan Johansson, Shenzhen (CN); Hui Gao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 604 days.

(21) Appl. No.: 13/981,309

(22) PCT Filed: Jul. 31, 2010

(86) PCT No.: PCT/CN2010/075620
§ 371 (c)(1),
(2), (4) Date: Dec. 5, 2013

(87) PCT Pub. No.: WO2012/016368
PCT Pub. Date: Feb. 9, 2012

(65) Prior Publication Data
US 2014/0087729 A1    Mar. 27, 2014

(51) Int. Cl.
*H04W 36/24* (2009.01)
*H04W 36/00* (2009.01)
*H04W 24/10* (2009.01)
*H04W 36/36* (2009.01)
(Continued)

(52) U.S. Cl.
CPC .......... *H04W 36/245* (2013.01); *H04W 24/10* (2013.01); *H04W 36/0083* (2013.01); *H04W 24/02* (2013.01); *H04W 36/36* (2013.01); *H04W 48/08* (2013.01)

(58) Field of Classification Search
CPC .......... H04W 36/0083; H04W 36/245; H04W 36/30; H04W 36/04; H04W 36/38; H04W 24/10; H04W 24/02; H04W 36/88; H04W 36/14; H04W 36/36; H04W 48/08
See application file for complete search history.

(56) References Cited

U.S. PATENT DOCUMENTS 5,175,867 A * 12/1992 Wejke et al. .................. 455/439
7,835,525 B2   11/2010 Jang et al.
8,208,925 B2 *  6/2012 Attar et al. .................... 455/436
(Continued)

FOREIGN PATENT DOCUMENTS

CN    1244998 A    2/2000
CN    1489338 A    4/2004
(Continued)

OTHER PUBLICATIONS

Uh Awei, "Intra-frequency Handover Measurements," S5-080659, 3GPP TSG-SA5 (Telecom Management), Meeting SA5#59, Discussion and Decision, Chengdu, China, Apr. 21-25, 2008, 5 pages.
(Continued)

*Primary Examiner* — Nizar Sivji
(74) *Attorney, Agent, or Firm* — Slater Matsil, LLP

(57) ABSTRACT

An apparatus configured to operate in a telecommunications network comprising a first base station configured to serve at least a first cell and a second base station configured to serve at least a second cell, wherein said apparatus comprises a controller configured to receive measurements related to a successful handover of a user equipment from a first cell to a second cell, wherein said measurements relate to measurements being taken before and/or during said handover.

24 Claims, 4 Drawing Sheets

(51) Int. Cl.
 *H04W 48/08* (2009.01)
 *H04W 24/02* (2009.01)

(56) References Cited

U.S. PATENT DOCUMENTS

2011/0026492 A1* 2/2011 Frenger ................ H04W 36/34
 370/331
2011/0310852 A1* 12/2011 Dimou et al. ................ 370/332

FOREIGN PATENT DOCUMENTS

| CN | 1889768 A | 1/2007 |
|---|---|---|
| WO | 2009123512 A1 | 10/2009 |
| WO | WO 2009/123512 A1 | 10/2009 |

OTHER PUBLICATIONS

Qualcomm, "Performance Measurements for Handover Parameter Optimisation," S5-081092, 3GPP TSG-SA5 (Telecom Managment), Meeting SA5#60, Discussion & approval, Sophia Antipolis, France, Jul. 7-11, 2008, 11 pages.

NTT Docomo, "Evaluation of Rel-8 LTE mobility perfomance," Tdoc R2-093273, 3GPP TSG-RAN WG2 #66 Meeting, San Francisco, CA, May 4-8, 2009, 14 pages.

Dimou, K., et al., "Handover within 3GPP LTE: Design Principles and Performance," Vehicular Technology Conference Fall, Sep. 20-23, 2009, 5 pages.

"3rd Generation Partnership Project; Technical Specification Group Radio Access Network; UTRAN functions, examples on signalling procedures (Release 9)," 3GPP TR 25.931 V9.0.0, Technical Report, Dec. 2009, 130 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.2.0, Technical Specification, Dec. 2009, 178 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.3.0, Technical Specification, Mar. 2010, 166 pages.

"3rd Generation Partnership Project; Technical Specification Group Radio Access Network; Evolved Universal Terrestrial Radio Access Network (E-UTRAN); X2 application protocol (X2AP) (Release 9)," 3GPP TS 36.423 V9.2.0, Technical Specification, Mar. 2010, 120 pages.

"3rd Generation Partnership Project; Technical Specification Group Services and System Aspects; Telecommunication management; Self-Organizing Networks (SON) Policy Network Resource Model (NRM) Integration Reference Point (IRP); Information Service (IS) (Release 9)," 3GPP TS 32.522 V9.0.0, Technical Specification, Mar. 2010, 22 pages.

"3rd Generation Partnership Project; Technical Specification Group Services and System Aspects; Telecommunications Management; Self-Organizing Networks (SON) Policy Network Resource Model (NRM) Integration Reference Point (IRP); Requirements (Release 9)," 3GPP TS 32.521 V9.0.0, Technical Specification,Mar. 2010, 24 pages.

"3rd Generation Partnership Project; Technical Specification Group Services and System Aspects; Telecommunication management; Performance Management (PM); Performance measurements Evolved Universal Terrestrial Radio Access Network (E-UTRAN) (Release 9)," 3GPP TS 32.425 V9.3.0, Technical Specification, Jun. 2010, 51 pages.

"3rd Generation Partnership Project; Technical Specfication Group Radio Access Network; Evolved Universal Terrestrial Radio Access (E-UTRA); Radio Resource Control (RRC); Protocol specification (Release 9)," 3GPP TS 36.331 V9.3.0, Technical Specification, Jun. 2010, 250 pages.

Legg, P., et al., "A simulation study of LTE intra-frequency handover performance," Vehicular Technology Conference, Sep. 6-9, 2010, 5 pages.

Jansen, T., et al., "Handover parameter optimization in LTE self-organizing network," 72nd Vehicular Technology Conference, Ottawa, Canada, Sep. 6-9, 2010, 18 pages.

International Search Report received in International Application No. PCT/CN2010/075620 mailed Dec. 23, 2010, 3 pages.

* cited by examiner

ARRANGEMENT AND METHOD FOR OPTIMISING HANDLING OF HANDOVERS IN TELECOMMUNICATION SYSTEMS

FIELD

The present application relates to a method and an arrangement in telecommunication systems, and in particular to an arrangement and a method for handling handovers in a telecommunication system.

BACKGROUND

A key feature in most cellular communication systems is the ability to handoff an ongoing communication service from one cell to another. Handover (HO) methods and algorithms can be classified in many different ways, e.g. as soft handover where a mobile station is connected to several base stations, softer handover where a mobile station is connected to several cells or sectors belonging to the same base station, and hard handover where the mobile station disconnects from the old base station before connecting to the new base station. Methods for handover decisions can be also be classified as being network controlled HO (NCHO), in which the mobile is passive, mobile assisted HO (MAHO), in which the mobile e.g. measures the strengths of received signals and reports the measured values to the network where a handover decision is then taken, and mobile controlled HO (MCHO), in which the mobile e.g. measures the strengths of received signals and makes a handover decision based on the measured values.

One important class of handover algorithms is the radio-signal-measurement (RSM) triggered schemes. Most RSM triggered handover schemes perform averaging or low-pass filtering of measured data. Furthermore, the handover decision algorithms belonging to this class typically include, at least, a hysteresis margin and a time-to-trigger threshold that the filtered data samples are compared against during the handover decision process. The 3rd Generation Partnership Project (3GPP) is a collaboration agreement that brings together a number of telecommunications standards bodies. Within the 3GPP workgroups a new system concept denoted Long Term Evolution (LTE) and System Architecture Evolution (SAE) are being standardized. The architecture of the 3GPP LTE/SAE system (denoted LTE here after), which is schematically illustrated in FIG. 1, is flat compared to e.g. GSM (Global System for Mobile communications) and WCDMA (Wideband Code Division Multiple Access) based systems. FIG. 1 shows that the LTE radio base stations 100a, 100b, 100c (denoted eNodeBs, or eNBs, in 3GPP terminology) are directly connected to the core network nodes 101a, 101b MME/S-GWs (mobility management entity/serving gateway) via the S1 interfaces 102a, 102b, 102c, 102d. The S1 interface supports a many-to-many relation between MMEs/Serving Gateways and eNBs. There is no central radio network controller in the Evolved UMTS Terrestrial Radio Access Network (E-UTRAN). Instead the eNBs are connected to each other via the direct logical X2 interfaces 103a, 103b, 103c. The handover method that will be used in the 3GPP LTE/SAE system is RSM triggered and the mobile assisted (MAHO) hard handover. In LTE the mobile station, also referred to as the user equipment (UE), performs measurements of the downlink and the network makes the handover decisions. Compared to legacy cellular systems, as stated above, the LTE system does not have any central radio network controller (like the BSC in GSM and the RNC in WCDMA) where the handover algorithm is located. Instead the handover decisions in LTE will be performed in the base stations (referred to as eNBs in LTE). The decision to initiate a handover from a source cell to a target cell will be made in the source cell by the radio base station.

The UEs are configured by a radio resource control (RRC) entity in the source cell to perform measurements on handover candidate cells and to report these measurements to the source eNB during active mode. The details of how these measurements are configured are not yet decided in 3GPP. The handover measurement configuration is sent as dedicated messages to each individual UE.

The RRC messages for configuration of handover measurements as well as the corresponding UE measurements will be standardized and will not be subject to vendor specific interpretation or implementation. A typical configuration is that the UE will start to report periodically to the radio base station of a handover candidate cell once the filtered reference symbol received power (RSRP) of the candidate has reached a certain level compared to the RSRP level of the source cell during a configurable time. Alternatively, the UE could send a single report stating that prerequisites for a handover are fulfilled.

FIG. 2 shows a diagram that illustrates a conventional handover procedure from a source cell to a target cell in LTE. The vertical axis shows signal level and the horizontal axis shows time. The UE is configured by the source cell RRC to perform measurements on the source cell RSRP (RSRP1) and on candidate cells RSRP, i.e. possible target cells to which handover might be likely to occur. It should be noted that only one candidate cell measurement RSRP2 is shown. The measurement command contains information about how the UE shall process, e.g. by filtering or averaging, the measured data and when the UE shall start to report measurements to the source eNB. In this example the UE is configured to start to perform periodic reporting once the candidate RSRP2 value is larger than the source cell RSRP1 plus a hysteresis margin 21 during a certain time period 22 (time-to-trigger, or TTT). This occurs at a time denoted Ta. The purpose of the hysteresis margin is to prevent that action is taken prematurely. The hysteresis margin is defined as a predefined minimum difference between measurement values. In the example in FIG. 2 the hysteresis margin 21 defines a minimum difference between RSRP1 and RSRP2. After the source eNB1 has received one or several reports from the UE a decision to initiate handover to the target eNB2 is taken by eNB1. The eNB1 sends a handover request to eNB2 at a time denoted Tb, and when the handover is prepared the eNB1 sends at a time denoted Tc a handover command instructing the UE to perform the handover to eNB2.

The simplest handover decision process in the source eNB is to instigate a handover immediately after it has received the triggered measurement report from the UE. More sophisticated algorithms could process, e.g. by means of low-pass filtering, the UE measurements and by comparing the processed values with a hysteresis margin and with a time-to-trigger threshold. The eNB may use different handover related parameters (in the UE measurement configuration or the decision algorithm) when considering handover to different target cells.

Furthermore the eNB may classify UEs based on the speed or their handover history and the eNB may use different parameters for different UE classes. In this way the eNB may e.g. use a particular set of handover related parameters for UEs that are classified as high speed UEs. For high speed UEs the time-to-trigger might need to be reduced compared to low speed UEs. Alternatively, the eNB in a first cell may know that UEs that enter from a second cell will almost always perform handover to a third cell. To ensure that such UEs, that might be moving in a train or along a road, end up in the correct target cell the hysteresis margin to the desired target cell may be reduced for this particular class of UEs.

The fact that the handover algorithm in LTE is performed by the eNB, and not in a central node controlling several base stations, as e.g. in an RNC in the WCDMA based UMTS, results in several problems that need to be addressed. To begin with, there is no simple way to ensure that handovers within a geographical area are performed based on the same algorithm. This becomes particularly difficult in a multi vendor scenario since it is likely that different eNB vendors will implement different proprietary handover algorithms. Consequently, the criteria for when to perform a handover between two cells of the same type may be completely different depending on which cell that acts as source cell. Furthermore, within an area the criteria for when to perform a handover from an LTE system to a system having a different radio access technology (e.g. WCDMA) may also differ depending on which cell that currently is serving a particular UE. Another problem is related to the planning and optimization of the handover related parameters that control the behaviour of the handover algorithm(s). In case of network planning the operator may be faced with the difficult task of setting a large number of handover related parameters corresponding to the particular algorithm implementations of different vendors. Each parameter will have its own definition and impact on the handover behaviour. According to the 3GPP the handover preparation phase is initiated when the source eNodeB sends a HANDOVER REQUEST (HO_REQUEST) message to a target eNB via the X2 or the S1 interface. It has been proposed but not agreed in 3GPP to add an optional information element denoted HO_RRM_CONTAINER into the HO_REQUEST message. The content of this container is proposed not to be subject to standardization and hence an eNB vendor may put proprietary information into it. In case both the source and the target eNB are manufactured by the same vendor this optional container can be useful for support of more advanced handover methods. To have some consistency in the handover behaviour in the network the operator may then decide to only employ eNBs from one vendor in a certain area. However also this might be problematic, since in different types of base stations (macro, micro, pico) it can make sense to implement different handover algorithms. Macro-cells, micro-cells, and pico-cells, respectively, refer to cells of different sizes, whereby a macro-cell, which is a normal cell, is the largest, and a pico-cell is the smallest. For example, a pico-cell may not have to handle handover of high speed UEs.

As mentioned above, existing solutions for handover parameter optimization rely on the handover being performed in a central controller node. This is not applicable for LTE. Instead the handover decisions are distributed to the radio base station where different vendors may implement their own proprietary algorithms. The complexity of the problem of manually optimizing handover parameters in a single or multi-vendor scenario is large. Handover parameter auto-tuning, or auto-adjusting, methods are complex but are facilitated by standardized signaling related to handover failure events. This allows eNBs from different vendors to work alongside each other even though they employ different decision algorithms and may employ different measurement configurations.

Radio Link Failures, RLFs, may occur due to Too Early or Too Late Handovers, or Handover to Wrong Cell. Therefore it is of importance to be able to detect such events at the original source cell and this can be done through the following procedures:

[Too Late HO] If the UE attempts to re-establish the radio link at eNB B after a RLF at eNB A then eNB B may report this RLF event to eNB A by means of the RLF Indication Procedure.

[Too Early HO] eNB B may send a HANDOVER REPORT message indicating a Too Early HO event to eNB A when eNB B receives an RLF Indication from eNB A and if eNB B has sent the UE Context Release message to eNB A related to the completion of an incoming HO for the same UE within the last Tstore_UE_cntxt seconds.

[HO to Wrong Cell] eNB B may send a HANDOVER REPORT message indicating a HO To Wrong Cell event to eNB A when eNB B receives an RLF Indication from eNB C, and if eNB B has sent the UE Context Release message to eNB A related to the completion of an incoming HO for the same UE within the last Tstore_UE_cntxt seconds. The indication may also be sent if eNB B and eNB C are the same and the RLF report is internal to this eNB.

The detection of the above events is enabled by the RLF Indication and Handover Report procedures.

The RLF Indication procedure may be initiated after a UE attempts to re-establish the radio link at eNB B after a RLF at eNB A. The RLF INDICATION message sent from eNB B to eNB A shall contain the following information elements:

Failure Cell ID: PCI of the cell in which the RLF occurred;
Reestablishment Cell ID: ECGI of the cell where RL re-establishment attempt is made;
C-RNTI: C-RNTI of the UE in the cell where RLF occurred.
shortMAC-I (optionally): the 16 least significant bits of the MAC-I calculated using the security configuration of the source cell and the re-establishment cell identity.

eNB B may initiate RLF Indication towards multiple eNBs if they control cells which use the PCI signaled by the UE during the re-establishment procedure. The eNB A selects the UE context that matches the received Failure cell PCI and C-RNTI, and, if available, uses the shortMAC-I to confirm this identification, by calculating the shortMAC-I and comparing it to the received IE.

The Handover Report procedure is used in the case of recently completed handovers, when an RLF occurs in the target cell (in eNB B) shortly after it sent the UE Context Release message to the source eNB A. The HANDOVER REPORT message contains the following information:

Type of detected handover problem (Too Early HO, HO to Wrong Cell)
ECGI of source and target cells in the handover
ECGI of the re-establishment cell (in the case of HO to Wrong Cell)
Handover cause (signaled by the source during handover preparation).

The international application WO2009123512 discloses methods and arrangements for handling handover-related parameters. A radio base station of a mobile communications network is arranged to serve at least a first cell, and to make handover decisions based on handover-related parameters. The radio base station comprises means for receiving handover related feedback from a radio base station serving a second cell after handover of a UE from said first cell to said second cell; means for using the handover related feedback received from the base station serving said second cell to adjust the handover-related parameters; and further by means for sending handover related feedback to a radio base station serving a second or another cell after handover of a UE to said first cell from said second or another cell. In these methods and arrangements measurements are taken after handover to determine whether the parameters for initiating a handover should be modified or not.

Other methods are available using the 3GPP detection procedures described above, but they focus on handover failures and due to the relatively low frequency of such failures the resulting adaptation would be slow and a system using such an update scheme will not be able to react to quick changes in handover environment which can change within 15 minutes due to for example cell loading or traffic speed changes.

Thus an alternative manner of adjusting the parameters for handovers leading to a faster update would thus be useful.

SUMMARY

On this background, it would be advantageously to provide an apparatus, a computer program stored on a storage medium and a method that overcomes or at least reduces the drawbacks indicated above by providing an apparatus configured to operate in a telecommunications network comprising a first base station configured to serve at least a first cell and a second base station configured to serve at least a second cell, wherein said apparatus comprises a controller configured to receive measurements related to a successful handover of a user equipment from a first cell to a second cell, wherein said measurements relate to measurements being taken before and/or during said handover.

Such an apparatus is thus able to introduce or re-use existing measurements in a base station or a user equipment and utilize these to get an understanding of how close to handover failure the current communication channel is operating. The apparatus is configured to estimate the handover failure probability which can be compared with a handover failure rate target, and also to identify the probable failure mechanisms for the handover. Measurements are performed on successful handovers.

Such an apparatus is also able to determine how close the handover was to failure as the apparatus is configured to assess the performance of the RRC procedures of the handover procedure itself.

The aspects of the disclosed embodiments are also directed to providing a method for execution on an apparatus configured to operate in a telecommunications network comprising a first base station configured to serve at least a first cell and a second base station configured to serve at least a second cell and comprising a processor, wherein said processor is configured to execute said method, said method comprising receiving measurements related to a successful handover of a user equipment from a first cell to a second cell, wherein said measurements relate to measurements being taken before and/or during said handover.

The aspects of the disclosed embodiments are also directed to providing a computer readable medium including at least computer program code for controlling an apparatus configured to operate in a telecommunications network comprising a first base station configured to serve at least a first cell and a second base station configured to serve at least a second cell, said computer readable medium comprising software code for receiving measurements related to a successful handover of a user equipment from a first cell to a second cell, wherein said measurements relate to measurements being taken before and/or during said handover.

Further objects, features, advantages and properties of device, method and computer readable medium according to the present application will become apparent from the detailed description.

BRIEF DESCRIPTION OF THE DRAWINGS

In the following detailed portion of the present description, the teachings of the present application will be explained in more detail with reference to the example embodiments shown in the drawings, in which.

DETAILED DESCRIPTION

In the following detailed description, the apparatus, the method and the software product according to the teachings of this application will be described by the embodiments. It should be noted that although only a mobile phone, a base station and a server are described the teachings of this application can also be used in any electronic device operating in a telecommunications network such as portable electronic devices such as media players, game consoles, laptops, Personal Digital Assistants, electronic books and notepads.

In the prior art systems the systems are designed to adjust the parameters for a handover upon detection of a handover failure. As the handover failure rates are relatively low, as the systems are designed to keep them to a minimum, the input is very sparse and thus it is difficult to determine an accurate failure rate if the measurements are not being made over a long time. A consequence of this is that the parameters should be adjusted slowly to prevent unnecessary updates, and this further slows down the update procedure.

In such systems an update period is in the order of 24 hours. Such systems are also not able to track short term fluctuations in the handover environment, for example due to increase in the speed at which an UE travels at the end of a rush hour or an increase in the interference during a busy hour.

To overcome these drawbacks and allow for a faster update a handover probability is determined upon each or at least some handovers. This probability can then be compared to the handover failure rate.

To determine a handover probability the apparatus is arranged to perform measurements of parameters relevant to the handover.

In one embodiment such measurements are made for a successful handover. In one embodiment such measurements are made for each successful handover. In one embodiment such measurements are made for a failed handover. In one embodiment such measurements are made for each failed handover. In one embodiment such measurements are made for a successful and a failed handover.

Figure 1:
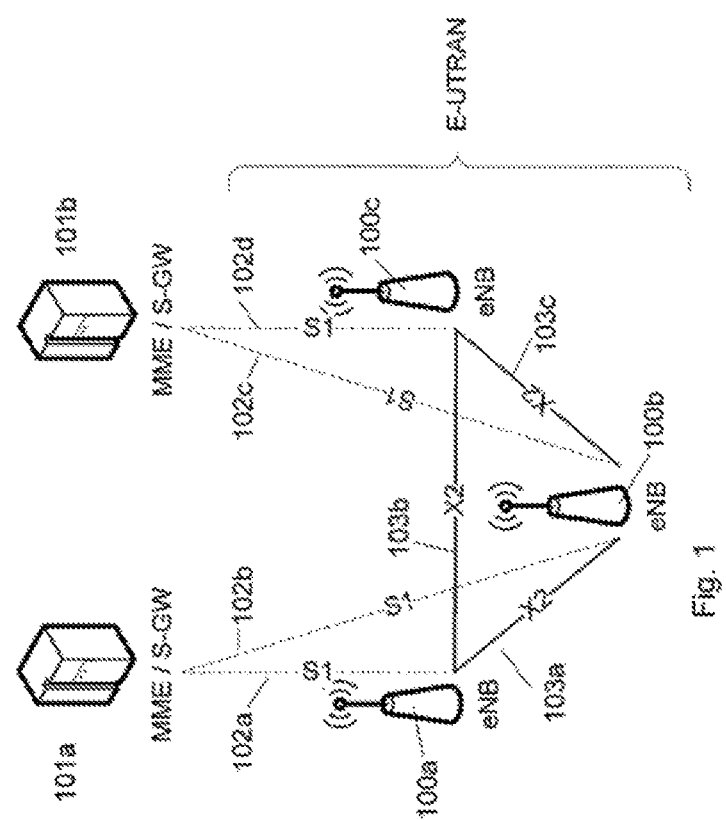
FIG. 1 is an overview of a telecommunications system in which a device according to the present application is used according to an embodiment.
Figure 2:
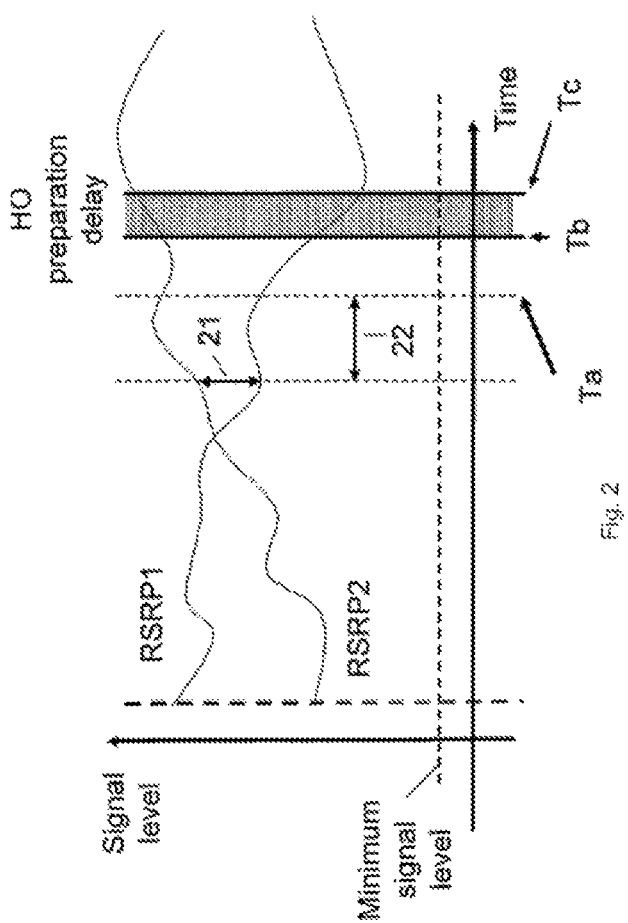
FIG. 2 is a schematic view of signal strength from different base stations for a user equipment in motion over time.
Figure 3:
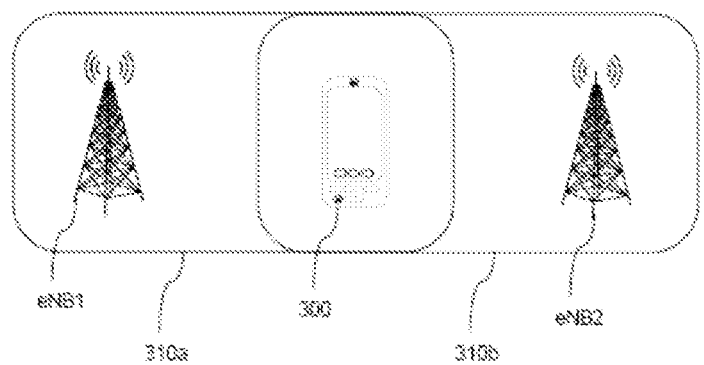
FIG. 3 is a schematic view of a partial network in accordance with the present application.

An embodiment of a user equipment UE in the form of a mobile phone 300 is illustrated in FIG. 3. The mobile phone 300 is currently in an area covered by two cells 310a and 310b each served by a base station or node, eNB1 and eNB2.

In this example embodiment the cell 310a is the source cell and the call 310b is the target cell.

As the UE 300 moves from an area in source cell 310a to an area in target cell 310b a handover will be effectuated by the two base stations eNB1 and eNB2. How this handover is performed is well-known to a skilled person and will thus not be described in detail herein.

In one embodiment a controller is configured to collect measurements from a handover and based on these measurements determine a probability of handover success. The controller is further configured to compare the probability of handover success with the target handover failure rate and if there is a significant divergence the parameters which indicate when a handover is to be effectuated are changed or modified through a Mobility Robustness Optimisation algorithm, an MRO.

As is known to a skilled person a handover failure, also denoted Radio Link Failure or RLF can be of here different types.

Too Early HO (HO=Hand Over) which denotes when an HO is effectuated before it is necessary. Such HOs can lead to a RLF or to a UE bouncing back and forth between two cells thus creating unnecessary HOs.

Too late HO events which denotes that a UE tried to establish contact with another cell too late and the connection is therefore lost due to an RLF.

To the wrong cell HO which denotes that a UE has established contact events with the wrong target cell, and a RLF has occurred.

There is a conflicting relationship between the HO failure rate for an MRO and the number of handovers executed in a system. To maintain a very small failure rate the system will execute a large number of handovers which leads to increased traffic unnecessarily. Thus, a target failure rate that is not too low is preferable. In one embodiment such a target failure rate is 1%.

During a handover radio link failure can result from different reasons:
  RLF declared by the UE as a result of out-of-sync indications passed from Layer 1 (physical layer) to Layer 3 (Radio Resource Control RRC)
  RLF declared by the UE in the RLC (Radio Link Control) layer when the maximum number of transmissions has been reached but an Up Link UL RRC message has still not been delivered.
  RLF declared by the eNB in the RLC layer when the maximum number of transmissions has been reached but an Down Link DL RRC message has still not been delivered.
  Random access failure when the UE attempts to send the HO confirm message to the target cell (this is called "Handover Failure" by 3GPP).

Figure 4:
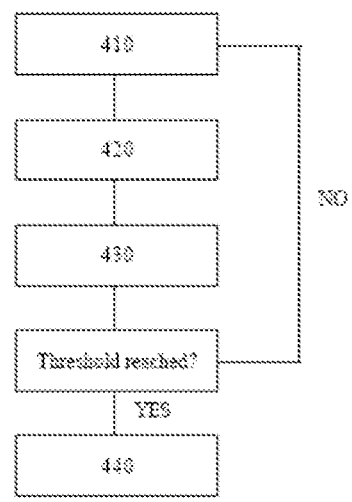
FIG. 4 is a flow chart describing a method according to an embodiment.

Radio Link Failure (RLF) as a result of layer 1 measurements by the UE is shown schematically in FIG. 4. In a first time span a UE is working in normal operation 410. A Radio problem is then detected 420 by RRC when a number of consecutive out-of-sync messages are received from Layer 1, and the count exceeds a threshold (N310 in 3GPP). A timer which in 3GPP is called T310, is then started 430. If the number of consecutive in-sync messages reaches a certain threshold (N311) while the timer is running, the timer is stopped and the UE returns to normal operation 410. If the timer expires a radio link failure is detected and communicated 440.

A controller according to the present application is configured to retrieve and/or receive measurements already during steps 410 and 420 and also 430 and does not wait until step 440 before collecting necessary data.

Thus a controller according to the embodiments herein is configured to enable adapting the parameters based on measurement readings even though no radio link failure has occurred.

In one embodiment a controller is configured to receive the count of out-of-sync indications.

If this number is high it is indicative that a RLF was highly probable and that the parameters should be changed.

In one embodiment a controller is configured to receive the count of in-sync indications.

If this number is low it is indicative that a RLF was highly probable and that the parameters should be changed.

In one embodiment a controller is configured to receive the value of the timer.

If the timer value is high it is indicative that a RLF was highly probable as the timer only runs when the UE has generated at least N310 out-of-sync indications and less than N311 in-sync indications, and that the parameters should be changed. The timer value is indicative of the time during the handover in which poor downlink radio conditions occurred. Since T310 may be stopped, reset and restarted in the time just before or during the handover, the reported value could be a set of values or the maximum value of the set. A suitable window to make an assessment over would be from the generation of a triggered measurement report until the end of the handover.

If a signal in a cell is weak this will lead to that some errored transmissions resulting in retransmit requests. In a 3GPP or LTE network such requests can be Hybrid Automatic Repeat Requests, HARQ. Another type of retransmission is RLC retransmissions for AM bearers (AM=Acknowledged Mode).

In one embodiment a controller is configured to receive a number of retransmissions.

If this number is high it is indicative that a UE is close to an edge of a cell in where the signal strength or signal quality is usually low and that a RLF is highly probable and that the parameters should be changed.

In one embodiment a controller is configured to receive a number of access attempts. In one embodiment such access attempts are part of a Random Access Channel RACH procedure.

If this number is high it is indicative that a UE is close to an edge of a cell in where the signal strength or signal quality is usually low and that a RLF is highly probable and that the parameters should be changed.

In one embodiment a controller is configured to receive a measurement of the power headroom for UL RRC signaling during the handover.

If the power headroom is low it is indicative that a UE is close to an edge of a cell in where the signal strength or signal quality is usually low and that a RLF is highly probable and that the parameters should be changed.

When sending an RRC message the scheduler typically only issues a grant sufficient to deliver the RRC message without any user plane (Dedicated Traffic Channel DTCH) traffic. The power headroom indicates the remaining available power in the UE—if this is small or zero the UE is operating at or close to its maximum power level. When the UE hits the maximum power level it may not be able to reach the Signal to Interference Ratio SIR required at the eNB.

In one embodiment the controller is configured to receive a modulation and coding Scheme (MCS).

In LTE the scheduler at the eNB dictates the modulation and coding scheme (MCS) used by the UE, for both downlink and uplink. When the SIR of a transmission is low the MCS is low. MCS values range from 1 to 15 on the downlink (1 represents (Quadrature Phase Shift Keying) QPSK at code rate 0.076).

A low MCS is therefore indicative of that there is an increased probability of radio link failure and that the parameters should be changed.

In one embodiment the controller is configured to receive the downlink transmit power used since power control on the downlink will influence MCS selection.

In one embodiment the controller is configured to receive the interruption time. During Handover, the UE will stop communicating with the source cell and set-up a connection to the target cell—during this interval no user plane communication is possible.

The interruption time for successful handovers is correlated with the handover failure rate. One definition of handover interruption time is the time from the first transmission of the handover command to the reception of the HO Confirm. This time could be reported from the UE after a completed HO or calculated in the source cell by comparing the time for sending the handover command until receiving the context release from the target cell.

A high interruption time is indicative of a probable radio link failure because it may demonstrate that there are some difficulties in delivering the handover RRC messaging and there is increased risk of T310 expiry, and that the parameters should be changed.

In one embodiment the controller is configured to receive a delay time between receiving the HO Confirm from the UE until the UE context release is sent to the source cell and deduct this delay time from the calculated interruption time. The controller is further arranged to estimate the interruption time by subtracting the expected delay over X2 for the context release message.

This delay is typically 10 ms whilst the interruption time is of the order of >20 ms. With the UE reporting approach the interruption time received by the target cell can be passed over X2 to the source cell. Signaling over S1 is also possible.

In one embodiment the interruption time includes counting the time when the timer T310 is running during a handover. In one such embodiment the controller is configured to include in the interruption time the time from the generation of a triggered measurement report until the end of the handover.

In one embodiment the controller is configured to receive multiple measurements and determine the probability for radio link failure based on a combination of the received measurements.

In one embodiment the controller is configured to receive multiple measurements and determine whether the parameters for handovers should be changed or not based on a combination of the received measurements.

In one such embodiment the controller is configured to combine the measurements and their respective thresholds in a logical AND operation.

In another such embodiment the controller is configured to combine the measurements and their respective thresholds in a logical OR operation.

In another such embodiment the controller is configured to combine the measurements and their respective thresholds in a logical AND/OR operation.

In another such embodiment the controller is configured to combine the measurements and their respective thresholds according to a priority scheme.

An apparatus according to above is thus configured to estimate a probability for handover failure and adjust the parameters accordingly.

This leads to a faster update of the parameters than in the prior art.

As the update is faster the update can also be steeper to further speed up the update as if an update is incorrect, it will be updated again shortly anyhow.

It is thus possible to maintain a target handover failure rate with fewer handovers which saves data traffic and ensures a more reliable connection.

In one embodiment the controller is comprised within a base station.

In order to support detection of "too early HO", in which the communication between UE and target cell is crucial, the controller is configured to exchange the information between with other eNBs, more specifically that the target cell 310*b* reports information related to random access and Handover Confirm transmission to the source cell 310*a*.

Further, it is advantageous to control if this information should be reported from target to source or not. Therefore, it is suggested that the source cell 310*a* should include either an indication in the HO Request message whether the target cell should collect and forward this information or a criteria for when the measurement should be reported to the source cell 310*a*.

In one such embodiment the base station controls the source cell 310*a*. In such an embodiment the controller is configured to detect "Too late HO" problems and handle them.

In another such embodiment the base station controls the target cell 310*b*. In such an embodiment the controller is configured to detect "Too early HO" problems and handle them.

Thus there may in some cases be necessary to send information between the base station eNB1 of the source cell 310*a*.

One solution is to define a new information message from the target to the source.

Another solution is to re-use an existing message and include one or more of the measurements proposed in previous subsections.

Examples of existing messages from eNB handling target cell to eNB handling the source cell are UE context release and Handover report.

In one embodiment the controller is configured to handle a handover report message having a Handover Report Type (for example "almostTooEarly") and that a conditional information element containing the measurement(s) described above is added to the message.

To avoid sending too many messages a controller in one embodiment is configured to determine if a certain threshold or criterion which is relative to the requested measurement has been reached and only if so send the necessary information.

In one embodiment the source cell includes a flag to signal whether the source cell is interested in receiving measurements at all.

Figure 5:
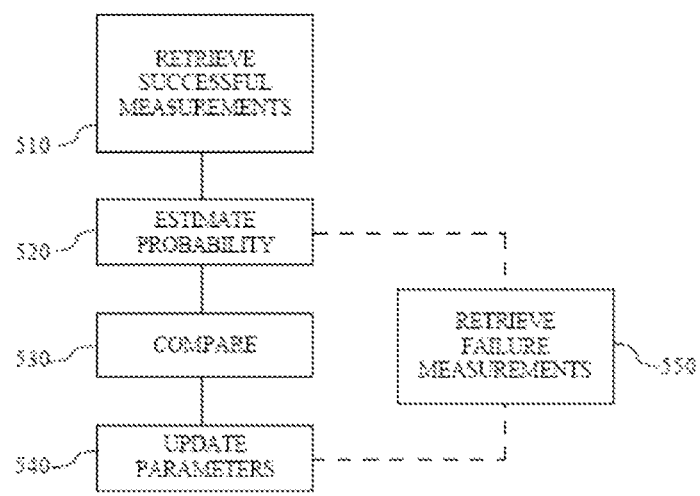
FIG. 5 is a flow chart describing a method according to an embodiment.

FIG. 5 shows a flowchart of a method according to an embodiment. The method relates to the retrieval of measurements which are used to estimate a probability for handover failure (or success) and compare this to the target failure rate and depending on the estimate adjust the handover parameters.

In a first step 510 measurements are taken during normal handover. The measurements are used to determine or estimate a probability of failure for a handover (520). The probability is compared to the target failure rate (530) and an MRO algorithm is then used to determine the correct or updated handover parameters (540).

In one embodiment a further step of retrieving measurements from failed handovers is performed 550. In one embodiment these measurements are used to determine the update parameters in step 540 (indicated by the dashed line). In one embodiment these measurements are used to estimate the probability in step 520 (indicated by the dashed line).

Thus an apparatus according to the teachings herein provides an increased update rate of HO parameters thus allowing short term handover environment changes to be tracked.

It should be noted that even though the description herein have focused on EUTRAN and 3GPP networks the teachings herein also find use in other networks where handovers occur.

The various aspects of what is described above can be used alone or in various combinations. The teaching of this application may be implemented by a combination of hardware and software, but can also be implemented in hardware or software.

The teaching of this application can also be embodied as computer readable code on a computer readable storage medium. Such storage mediums may be a random access memory, a read-only memory, a compact disc, a digital video disc, an EEPROM memory or other computer readable storage mediums.

Although the teaching of the present application has been described in detail for purpose of illustration, it is understood that such detail is solely for that purpose, and variations can be made therein by those skilled in the art without departing from the scope of the teaching of this application.

Features described in the preceding description may be used in combinations other than the combinations explicitly described.

The term "comprising" as used in the claims does not exclude other elements or steps. The term "a" or "an" as used in the claims does not exclude a plurality. A unit or other means may fulfill the functions of several units or means recited in the claims.

The invention claimed is:

1. A network device having a processor and memory configured to operate in a telecommunications network, the network device comprising:
a controller configured to receive one or more reference signal measurements related to a successful handover of a user equipment from a first cell to a second cell, to estimate a probability of handover failure from the one or more reference signal measurements, to compare the probability of handover failure to a target failure rate, to change a hysteresis margin when the probability of handover failure exceeds the target failure rate, and to send an instruction based on the hysteresis margin to another device in the telecommunications network, the hysteresis margin specifying how much a target reference signal received power (RSRP) must exceed a source RSRP before a handover is triggered, wherein the one or more reference signal measurements are taken before and/or during the successful handover.

2. The network device according to claim 1, wherein the network device is further configured to instruct the user equipment to perform the one or more reference signal measurements and forward the one or more reference signal measurements to a base station.

3. The network device according to claim 1, wherein the network device is further configured to instruct a first base station to perform the one or more reference signal measurements and forward the one or more reference signal measurements to a second base station, the first base station providing wireless access in either the first cell or the second cell.

4. The network device according to claim 1, wherein the one or more reference signal measurements relate to a number of in-sync and/or out-of-sync indications.

5. The network device according to claim 1, wherein the one or more reference signal measurements relate to a timer value and/or an interruption time.

6. The network device according to claim 1, wherein the one or more reference signal measurements relate to a number of retransmissions.

7. The network device according to claim 1, wherein the one or more reference signal measurements relate to user equipment power headroom.

8. The network device according to claim 1, wherein the one or more reference signal measurements relate to random access channel (RACH) attempts.

9. The network device according to claim 1, wherein the one or more reference signal measurements relate to a modulation and coding scheme.

10. The network device according to claim 1, wherein the network device is a base station.

11. The network device of claim 1, wherein the signal based on the hysteresis margin is either a handover instruction or a control signaling instruction specifying a parameter of the hysteresis margin.

12. A method comprising:
receiving, by a network device, one or more reference signal measurements related to a successful handover of a user equipment from a first cell to a second cell, wherein the one or more reference signal measurements relate to measurements being taken before and/or during the handover;
estimating a probability of handover failure from the one or more reference signal measurements;
comparing the probability of handover failure to a target failure rate;
updating handover parameters when the probability of handover failure exceeds the target failure rate, wherein updating the handover parameters when the probability of handover failure exceeds the target failure rate comprises changing a hysteresis margin when the probability of handover failure exceeds the target failure rate, the hysteresis margin specifying how much a target reference signal received power (RSRP) must exceed a source RSRP before a handover is triggered; and
sending an instruction based on the hysteresis margin to another device in the telecommunications network.

13. The method according to claim 12, further comprising instructing the user equipment to perform the one or more reference signal measurements and to forward the one or more reference signal measurements to a base station.

14. The method according to claim 12, further comprising instructing a first base station to perform the one or more reference signal measurements and to forward the one or more reference signal measurements to a second base station, the first base station providing wireless access in either the first cell or the second cell.

15. The method according to claim 12, wherein the one or more reference signal measurements relate to a number of in-sync and/or out-of-sync indications.

16. The method according to claim 12, wherein the one or more reference signal measurements relate to a timer value and/or an interruption time.

17. The method according to claim 12, wherein the one or more reference signal measurements relate to a number of retransmissions.

18. The method according to claim 12, wherein the one or more reference signal measurements relate to user equipment power headroom.

19. The method according to claim 12, wherein the one or more reference signal measurements relate to random access channel (RACH) attempts.

20. The method according to claim 12, wherein the one or more reference signal measurements relate to a modulation and coding scheme.

21. The method according to claim 12, wherein the apparatus is comprised in a base station.

22. The method of claim 12, wherein the signal based on the hysteresis margin is either a handover instruction or a control signaling instruction specifying a parameter of the hysteresis margin.

23. A non-transitory computer readable medium including at least computer program code for controlling a network device, the computer readable medium comprising software code for:
  receiving one or more reference signal measurements related to a successful handover of a user equipment from a first cell to a second cell, wherein the one or more reference signal measurements relate to measurements being taken before and/or during the handover;
  estimating a probability of handover failure from the one or more reference signal measurements;
  comparing the probability of handover failure to a target failure rate;
  updating handover parameters when the probability of handover failure exceeds the target failure rate, wherein the software code for updating the handover parameters when the probability of handover failure exceeds the target failure rate includes software code for changing a hysteresis margin when the probability of handover failure exceeds the target failure rate, the hysteresis margin specifying how much a target reference signal received power (RSRP) must exceed a source RSRP before a handover is triggered; and
  sending an instruction based on the hysteresis margin to another device in the telecommunications network.

24. The non-transitory computer readable medium of claim 23, wherein the signal based on the hysteresis margin is either a handover instruction or a control signaling instruction specifying a parameter of the hysteresis margin.

* * * * *